United States Patent [19]

Woelfel

[11] Patent Number: 4,489,184

[45] Date of Patent: Dec. 18, 1984

[54] MOLDING COMPOSITION

[76] Inventor: James A. Woelfel, 1818 Rockdale Ave., Lansing, Mich. 48917

[21] Appl. No.: 536,032

[22] Filed: Sep. 26, 1983

[51] Int. Cl.³ .................. C08L 63/10; C08L 67/06
[52] U.S. Cl. ..................... 523/466; 523/400; 523/500; 523/527; 525/31; 301/63 PW
[58] Field of Search .............. 525/31; 523/527, 500, 523/466, 400

[56] References Cited

U.S. PATENT DOCUMENTS

| 3,621,093 | 11/1971 | Svoboda | 525/31 |
| 3,793,398 | 2/1974 | Hokamura | 525/31 |
| 3,825,517 | 7/1974 | Ficarra | 525/31 |
| 3,882,187 | 5/1975 | Takiyama | 525/31 |
| 3,968,016 | 7/1976 | Wismer | 525/31 |
| 4,233,432 | 11/1980 | Curtis | 525/49 |
| 4,293,659 | 10/1981 | Svoboda | 525/31 |
| 4,294,490 | 10/1981 | Woelfel | 428/113 |
| 4,350,789 | 9/1982 | Rowe | 525/31 |
| 4,390,662 | 6/1983 | Ando | 525/28 |

*Primary Examiner*—John C. Bleutge
*Assistant Examiner*—Patricia Short

[57] ABSTRACT

This invention discloses a creep resistant thermoset molding composition which is of particular value as a material from which wheels can be made. The creep resistant molding composition of this invention is comprised of a mixture of a vinyl ester resin and a dicyclopentadiene polyester resin.

20 Claims, No Drawings

MOLDING COMPOSITION

TECHNICAL FIELD

The present invention relates to a creep resistant molding composition and to methods for the fabrication thereof. More particularly this invention relates to a molding composition comprising a vinyl ester resin and a dicyclopentadiene polyester resin that is cured with a free radical generator. The creep resistant molding compositions of this invention are of particular value for use in wheels for automobiles, trucks, tractors, airplanes, and the like.

BACKGROUND

Numerous polyester molding compositions are well known and widely used as a structural material in various articles of manufacture. Polyester/fiberglass composites are commonly employed as a substitute for metals in many applications. In some applications polyester/fiberglass composites exhibit properties that are superior to those of metals. For example, in applications that require high strength and light weight, such composites sometimes offer a very significant advantage. However, certain drawbacks have precluded polyester/fiberglass composites from being used in some applications. One of these drawbacks is the tendency for polyester/fiberglass composites to creep. Creep is especially troublesome in composite articles at elevated temperatures. Creep is the slow deformation of a material that is induced by a stress and which results in increasing strain.

Many attempts have been made to substitute polyester/fiberglass composites for the metal used in vehicle wheels. Unfortunately creep is a problem that cannot be tolerated in wheels which has precluded polyester/fiberglass composites from being a structural material that is totally satisfactory for use in this application. Creep normally cannot be tolerated in wheels since it causes the clamp torque between the fastener used to affix the wheel to a vehicle and the wheel to decrease. In other words, creep can result in the loosening of the lug nuts used to hold the wheel to the vehicle. Such a loss of torque is unsatisfactory since it could ultimately lead to unsafe vehicle performance. Shrinkage of composite materials at high temperatures is another problem that can cause such a loss of torque. Thus, materials that shrink at high temperatures are not acceptable for use as a material from which to make wheels. One approach to solving this problem is to control the arrangement of the fibers in the molded composites, particularly in the lug bolt hole area, see U.S. Pat. No. 4,294,490 which employs a paste of either an unsaturated polyester, a vinyl ester or an epoxy resin; a thickener, such as, a Group II metal oxide, hydroxides or alkoxides; a catalyst, such as, an organic peroxide or a hardner; an inert filler, such as, calcium carbonate or clay; and a mold release agent, such as, zinc stearate to mold the wheel containing the reinforcing fibers.

SUMMARY OF THE INVENTION

This invention discloses a creep resistant molding composition comprising a vinyl ester resin and a dicyclopentadiene polyester resin. The molding compositions of this invention also normally contain a vinyl-substituted aromatic compound. These creep resistant molding compositions are cured with free radical generators.

The creep resistant molding compositions of this invention can also be fabricated with various fibers, fillers, and pigments to produce composite articles. Thus, this invention reveals a creep resistant composite comprising a vinyl ester resin, a dicyclopentadiene polyester resin, a fiber, and a filler. This invention further discloses articles of manufacture comprised of the creep resistant molding compositions and composites revealed herein.

The creep resistant molding compositions and creep resistant composites of this invention are of enormous value as structural materials from which wheels for automobiles, trucks, tractors, airplanes, and the like can be made. Thus, this invention further reveals a wheel comprised of (1) a vinyl ester resin, (2) a dicyclopentadiene polyester resin, (3) a fiber reinforcement, and (4) a filler. The wheels of this invention exhibit excellent torque retention under conditions of high heat as is experienced during periods of heavy braking.

DETAILED DESCRIPTION OF THE INVENTION

The creep resisting molding compositions of this invention are comprised of a vinyl ester resin and a dicyclopentadiene polyester resin. Normally, these molding compositions will contain from about 10 to about 90 weight percent of the vinyl ester resin and from about 10 to about 90 weight percent of the dicyclopentadiene polyester resin, based upon the total amount of said resins in the molding composition. Preferably the molding compositions of this invention will contain from 30 to 70 weight percent of the vinyl ester resin and from 30 to 70 weight percent of the dicyclopentadiene polyester resin. It is most preferable for these molding compositions to contain from 40 to 60 weight percent of the vinyl ester resin and from 40 to 60 weight percent of the dicyclopentadiene polyester resin.

Vinyl ester resins are thermosetting resins that consist of a polymer backbone with an acrylate or methacrylate termination. These terminal acrylate or methacrylate groups have the structural formula:

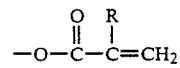

wherein R can be a hydrogen atom (acrylate termination) or a methyl moiety (methacrylate termination). Although vinyl ester resins have some times been classified as polyesters, they are typically diesters that (depending on the polymer backbone) contain recurring ether linkages. The backbone component of vinyl ester resins can be derived from an epoxide resin, polyester resin, urethane resin, and so on, with those being based on epoxide resins being of greatest commercial significance. In most cases these epoxide resins will have more than one epoxide group per molecule.

Vinyl ester resins are produced by the addition of ethenically unsaturated carboxylic acids, such as, methacrylate acid and acrylate acid, to an epoxide resin which is generally of the bisphenol A-epichlorohydrin type or the phenolic-novolac type. These ethenically unsaturated carboxylic acids are generally monocarboxylic acids or mixtures thereof which contain only one carboxyl group (—COOH) per molecule. For purposes of this invention vinyl ester resins which are prepared from epoxide resins of the phenolic-novolac type are generally preferred. The preparation of vinyl ester resins is described in detail in U.S. Pat. No. 3,564,074 and U.S. Pat. No. 3,548,030 which are incorporated herein by reference in their entirety.

Vinyl ester resins are sold by The Shell Chemical Company under the tradename Epocryl ™., The Dow Chemical Company under the tradename Derakane ™, The Reichhold Chemical Company under the tradename Corrolite ™ and Ashland Chemical. The phenolic-novolac based vinyl ester resins that are preferred for use in the practice of this invention have the general structural formula:

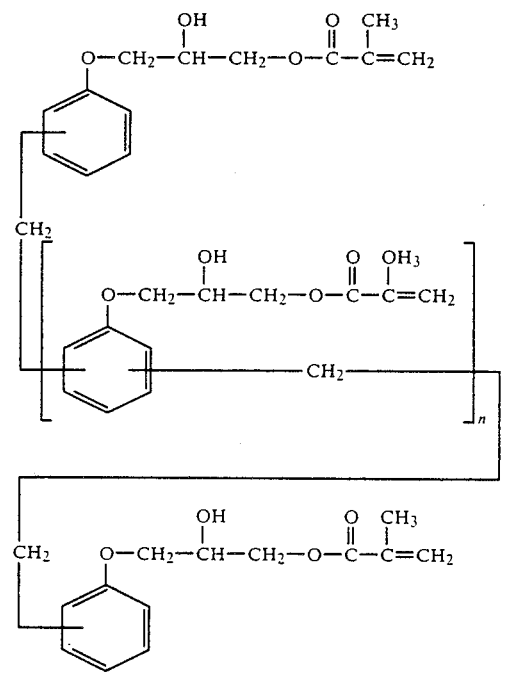

wherein n is 0 or 1.

The dicyclopentadiene polyester resins useful in this invention are well known in the air dry coating art, and generally are synthesized by first producing a prepolymer by esterifying dicyclopentadiene with an unsaturated dibasic acid at a temperature preferably less than 160° C. to preferably tie the dicyclopentadiene to the polyester backbone by ester linkages. It is sometimes desirable to react a portion of the glycol with a large excess of the dibasic acid to first form a glycol-dibasic acid which is primarily acid terminated which is reacted with the dicyclopentadiene and then the balance of the glycol is added and reacted to give the dicyclopentadiene polyester resin. Of course other methods are known for the preparation of these dicyclopentadiene polyester resins some of which are described by D. L. Nelson in his article "Considerations: Dicyclopentadiene in Polyester Resins" appearing in 36th Annual Conference, Reinforced Plastics/Composite Institute, published by The Society of the Plastics Industry, Inc. (Feb. 16–20, 1981). Particularly useful dicyclopentadiene polyesters are those made using the glycols and α, β unsaturated dibasic acids described in U.S. Pat. No. 3,883,612 incorporated hereby into this specification to define each of the terms and the reaction conditions. The ones made using dicyclopentadiene, maleic anhydride and propylene glycol as explained in Example 1 of the above patent may be used in this invention, but the ones described in the patent made using ethylene glycol and maleic or fumaric acid or anhydride to react with the dicyclopentadiene are satisfactory and in some cases most preferred.

U.S. Pat. No. 4,148,765 also discloses a method of producing dicyclopentadiene polyester resins and is incorporated herein by reference in its entirety. This reference relates to polyester resins and alkyd resins produced by reacting a polyol or alkylene oxide, an olefinically unsaturated dicarboxylic acid or anhydride or a saturated polycarboxylic acid or anhydride, water, and an effective amount of dicyclopentadiene.

Dicyclopentadiene polyester resins are commercially available. For example, Reichhold Chemical sells a dicyclopentadiene polyester resin under the tradename Polylite ™. Polylite ™ 92-313 (DD2908) and Polylite ™ 94-098 are dicyclopentadiene polyester resins that contain free styrene. Upon saponification this dicyclopentadiene polyester resin yields a product which upon chemical analysis has a content of 74 mole percent fumarate, 3 mole percent maleate, 23 mole percent dicyclopentadiene, 84 mole percent ethylene glycol, and 16 mole percent diethylene glycol. The mole ratio between the amount of fumarate, maleate, and dicyclopentadiene to ethylene glycol and diethylene glycol in this dicyclopentadiene polyester resin is 1:1. Dicyclopentadiene polyester resins having this composition are particularly useful in the practice of this invention.

Numerous dicarboxylic acids or anhydrides and glycols can be used in the synthesis of the dicyclopentadiene polyester resins of this invention. The preferred dicarboxylic acids for incorporation into the dicyclopentadiene polyester resins of this invention are fumaric acid (trans-1,2-ethylene dicarboxylic acid) and maleic acid (cis-1,2-ethylene dicarboxylic acid).

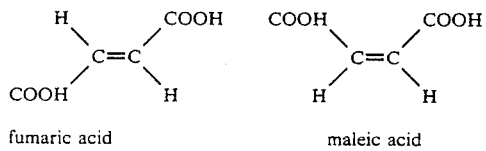

fumaric acid            maleic acid

Maleic anhydride can be employed successfully as a substitute for maleic acid. Normally dicarboxylic acids containing from 4 to 8 carbon atoms will be used in the preparation of dicyclopentadiene polyester resins useful in this invention.

The glycols used in the synthesis of the dicyclopentadiene polyester resins of this invention will normally contain from 2 to 8 carbon atoms. However, it is generally preferred for these glycols to contain from 2 to 6 carbon atoms (ethylene glycol, propylene glycol, dipropylene glycol and diethylene glycol). Ethylene glycol is the most preferred glycol for incorporation into the dicyclopentadiene polyester resins of this invention. The dicyclopentadiene polyester resins that are useful for incorporation into the compositions of this invention can have molecular weights that vary greatly over a wide range. However, it is generally preferred for these dicyclopentadiene polyester resins to have a molecular weight that ranges from about 140 to about 2000.

The creep resistant molding compositions of this invention also generally contain a polymerizable monomer containing at least one vinyl group ($-CH=CH_2$) in addition to the vinyl ester resin and the dicyclopentadiene polyester resin. Some representative examples of such polymerizable monomers containing a vinyl group include acrylic acid, methacrylic acid, and crotonic acid esters which include both saturated alcohol esters and hydroxyalkyl esters.

The polymerizable monomers containing a vinyl group that are most preferred are vinyl-substituted aromatic compounds. These vinyl-substituted aromatic compounds normally contain from 8 to 16 carbon atoms. Some representative examples of these vinyl-substituted aromatic compounds include styrene, alpha-methylstyrene, vinyl toluene, 3-methylstyrene, 4-methylstyrene, 4-cyclohexylstyrene, para-chlorostyrene, 3-vinyl-alpha-methylstyrene, 4-vinyl-alpha-methylstyrene, 1-vinyl napthalene, tertiary butyl styrene, diallyl phthalate, triallylcyanurate, 2-vinylnapthalene, and the like.

The amount of polymerizable monomer containing a vinyl group that is generally employed in the creep resistant molding compositions of this invention varies greatly. However, generally from about 10 percent to about 55 percent by weight of the polymerizable vinyl-monomer will be present in the molding composition, based upon the total weight of the molding composition. It is generally more preferred for about 20 to about 40 weight percent of the polymerizable vinyl-monomer to be present in the molding compositions of this invention, based upon the total weight of the molding composition (total weight of the vinyl ester resin, dicyclopentadiene polyester resin, and the polymerizable vinyl-monomer).

The creep resistant molding compositions of this invention are generally cured by employing a free radical generator. Some free radical generators that can be used for this purpose include various peroxides, radiation, and ultraviolet light. The free radical generators which are most commonly used include: the various peroxyester compounds such as
benzoyl peroxide,
tertiary butyl peroxy-2-ethylhexanoate
di-t-butyl peroxide,
dicumyl peroxide,
2,4-dichlorobenzoyl peroxide,
decanoyl peroxide,
lauroyl peroxide,
cumene hydroperoxide,
p-menthane hydroperoxide,
t-butyl hydroperoxide,
acetyl acetone peroxide,
methyl ethyl ketone peroxide,
succinic acid peroxide,
dicetyl peroxydicarbonate,
t-butyl peroxyacetate,
t-butyl peroxymaleic acid,
t-butyl peroxybenzoate,
acetyl cyclohexyl sulfonyl peroxide, and the like;
the various azo compounds such as
2-t-butylazo-2-cyano-propane,
dimethyl azodiisobutyrate,
azodiisobutyronitrile,
2-t-butylazo-1-cyanocyclohexane,
1-t-amylazo-1-cyanocyclohexane, and the like; and
the various alkyl perketals such as
2,2-bis-(t-butylperoxy)butane,
ethyl 3,3-bis(t-butylperoxy)butyrate,
1,1-di-(t-butylperoxy)cyclohexane, and the like.

Tertiary butyl peroxybenzoate (t-butyl perbenzoate) is the preferred initiator for use in curing the molding compositions of this invention. The amount of initiator used to cure the molding compositions of this invention will vary with the molding process used and with the type of initiator utilized. However, molding compositions will generally contain from 0.1 to 1 percent by weight initiators.

Articles of manufacture can easily be prepared using the creep resistant molding compositions of this invention. Various articles can also be manufactured with creep resistant composites prepared using the creep resistant compositions of this invention. In order to make such a creep resistant composite a fiber reinforcement and generally a filler is added to the creep resistant compositions of this invention. Thus, creep resistant composites can be prepared which comprise (1) a vinyl ester resin, (2) a dicyclopentadiene polyester resin, and (3) a fiber reinforcement. The fiber reinforcements used in the composites of this invention are generally glass fibers, aramide fibers, steel fibers, metallized glass fibers, quartz fibers, carbon fibers, boron fibers or graphite fibers. Normally glass fibers are preferred.

In most cases the creep resistant composites of this invention will be comprised of (1) a vinyl ester resin, (2) a dicyclopentadiene polyester resin, (3) a fiber reinforcement, and (4) a filler. Some fillers that are commonly used in the practice of this invention include: chalk, aluminum trihydrate, talc, clay, glass spheres, wollastonite, mica, kaolin, ceramic spheres, asbestos, calcium carbonate, and quartz. Various internal mold release agents such as, zinc stearate, certain phosphate esters, and calcium stearate, are also commonly employed in the creep resistant molding composition and composites of this invention. Various pigments can also be added including cadmium yellow, carbon black, iron oxide, titanium dioxide, etc., as well as organic pigments such as the phthalocyanine blues and greens.

Various chemical thickeners are generally added to the creep resistant composites of this invention. Some representative examples of such chemical thickeners include Group II metal oxides, hydroxides and alkoxides. The oxides and hydroxides of alkaline earths are preferred. For reasons of efficiency and economy, calcium oxide and magnesium oxide, or the respective hydroxides are most often employed.

It is preferred for the creep resistant composites of this invention to contain about 35 percent to about 75 percent by weight fiber reinforcement, about 15 percent to about 40 percent by weight of the creep resistant molding composition of this invention, and from about 5 percent to about 40 percent by weight of a filler. The most preferred creep resistant composites of this invention contain 45 percent to 70 percent by weight of a fiber reinforcement, 20 percent to 30 percent by weight of a creep resistant molding composition of this invention, and from about 7 percent to about 30 percent by weight of a filler. The creep resistant molding compositions used in the preparation of these preferred composites normally contain about 20 to about 40 weight percent styrene. Thus, these composites normally contain varying degrees of polystyrene upon curing.

The creep resistant molding compositions and composites of this invention are very valuable as materials from which wheels for various types of vehicles can be made. The composites of this invention have excellent properties for use in vehicle wheels since they are strong, resistant to creep, and do not shrink to an appreciable degree even at high temperatures. Automobile wheels have been manufactured employing the composites of this invention and have demonstrated that they are capable of torque retention that is equivalent to and in many cases superior to that of a magnesium wheel.

The following examples are provided to illustrate the preferred embodiments of this invention and are not intended to restrict the scope thereof in any manner. All parts and percentages in the following examples are by weight unless specifically indicated otherwise.

EXAMPLE 1

This experiment was conducted in order to demonstrate that the creep resistant composites of this invention can be used as the structural material for automobile wheels. A creep resistant molding composition was prepared by first mixing together, by successive additions in the order stated, the following materials (parts by weight):

| | |
|---|---|
| Vinyl ester resin (Derakane TM 790) | 11.639 |
| Dicyclopentadiene polyester resin (Polylite 92-313) | 11.639 |
| t-butyl perbenzoate | 0.279 |
| organic metallic complex | 0.093 |
| zinc stearate | 0.698 |
| calcium carbonate | 23.217 |
| carbon black | 0.047 |

A thickener was incorporated into the molding composition on a Cowles high speed mixer at about 38° C. Then this mixture was promptly put into a sheet molding compound (SMC) machine and spread as a layer on a sheet of polyethylene which was subsequently coated with a layer of chopped glass fiber.

Another layer of the molding composition on nylon was placed on top of the layer of chopped fiberglass, so as to sandwich the chopped fiberglass between two layers of creep resistant molding composition.

The thickener was made by blending the following materials in the order stated:

| | |
|---|---|
| vinyl ester resin- (Derakane TM 470-45*) | 0.361 |
| polyester (MR-1308A made by U.S. Steel Chemical Division) | 0.396 |
| calcium carbonate | 1.306 |
| Thickener - magnesium oxide | 0.265 |

*an epoxy novolac based vinyl ester resin

The chopped fiberglass layer which was sandwiched between two layers of molding composition on polyethylene sheets and nylon sheets was passed through a series of rollers to wet out the fibers producing a molded sheet about 0.3 cm thick. This sheet was allowed to age or mature for about 72 hours and then was shaped as a wheel in a steel compression mold at about 150° C. at a pressure of 1500 psi ($1.03 \times 10^7$ pascals).

The fiberglass used in the preparation of this wheel is sold by Owens Corning Fiberglass and is designated as OCF 433-114 which was chopped to a length of 1 inch (2.54 cm). This wheel contained about 50 percent by weight fiberglass, about 25 percent by weight resins and other materials, and about 25 percent by weight calcium carbonate as a filler.

EXAMPLE 2

Two wheels which were molded by utilizing the procedure and recipe described in Example 1 were installed as the front wheels on a 4-door 1980 Oldsmobile Omega equipped with a 4-cylinder engine. The lug nuts used to affix these wheels to the automobile were of the "bulge" type (General Motors part number 10018202. A lead based anti-seize compound (Balkamp #765-1363) was applied to the lug nut cone seats. The lug nuts were torqued to 100 ft./lbs. (foot/pounds).

The automobiles front disc brake pads were outfitted with Iron-Constantan thermocouple wires to measure temperatures of the brake lining according to SAE procedure J843d. The thermocouples were connected to temperature instrumentation inside the car. The vehicle was ballasted to a gross vehicle weight of about 3810 pounds (1728 kilograms). The vehicles weight balance was adjusted so as to have about 2100 pounds (953 kilograms) on the front.

This automobile was driven over a test course which included a 24 mile (39 kilometer) downhill drive on the Pike's Peak toll road located near Manitou Springs, Colo. This "Pike's Peak Brake Test" generates extremely high brake and wheel temperatures for extended periods of time. In fact, average brake pad temperatures ranges between 750° F. (399° C.) and 850° F. (454° C.) on the Pike's Peak test course with a peak temperature of 1080° F. (582° C.) being reached. It took about 45 minutes to drive down Pike's Peak.

After the brake pads had cooled to 100° F. (38° C.) the prevailing torques of the lug nuts were measured in the tightening direction. It was determined that these wheels had an average torque retention of 58% which is very good for this severe test.

EXAMPLE 3

The composite wheels tested in Example 2 were removed from the automobile and reapplied to it at 100 ft./lbs. of torque without reapplication of the anti-seize compound. This experiment was done so as to simulate reapplication of the wheels as would be encountered in the field after having a flat tire, brake repair, etc.

The Pike's Peak brake test explained in Example 2 was then repeated. After completion of this brake test the average retained torque for the composite wheels of this invention was determined to be 87%. Thus, the composite wheels of this invention performed very well in this reapplication test.

EXAMPLE 4

This test was conducted in order to show that the composite wheels of this invention can exceed the performance of magnesium wheels in torque retention. Two commercially available Cromodora magnesium wheels were tested using the procedure specified in Example 2. At the completion of this test they were found to have an average retained torque of 51%. Thus, the composite wheels of this invention which had average retained torques for 58% (Example 2) and 87% (Example 3) out performed the Cromodora magnesium wheels.

EXAMPLE 5

Steel wheels, which are sometimes provided as original equipment on Oldsmobile Omegas were tested using the procedure specified in Example 2. These steel wheels had an average torque retention of 67%. Thus, the composite wheels of this invention are comparable to steel wheels in torque retention.

EXAMPLES 6 THROUGH 10

A series of wheels were evaluated on the front positions of a front-wheel drive Chevrolet Citation for torque retention. The types of wheels tested are shown in Table I. This test consisted of mounting the wheels on the car to a starting (initial) torque of 100 ft./lbs. The car was then driven through a test course 4.1 miles (6.6 kilometers) long which included 14 stops from 60 miles per hour (97 kilometers per hour) at a rate of deceleration of 15 (ft./sec.$^2$) feet per second per second (4.6 meters per second per second). In Examples 6, 8, 9, and 10 the car was driven through the test course two times and in Example 7 the car was driven through the test course only one time. The average percentage of retained torque for each of the wheels tested is indicated in Table I.

TABLE I

| Example | Type of Wheel | Retained Torque |
|---|---|---|
| 6 | Composite | 58% |
| 7 | Control | 19% |
| 8 | Magnesium | 57% |
| 9 | Chrome | 75% |
| 10 | Steel | 79% |

The composite wheel tested in Example 6 was manufactured utilizing the molding composition of this invention as described in Example 1. The control wheel tested in Example 7 was a composite in which the molding composition utilized contained only vinyl ester resin and with that exception it was manufactured by utilizing the procedure specified in Example 1. A commercially available Cromodora magnesium wheel was tested in Example 8 and a commercially available steel wheel sometimes provided as original equipment on "X-cars" made by General Motors was tested in Example 10. In Example 9 a chrome plated spoke wheel (5 spokes) which is sometimes provided as original equipment was tested.

These examples show that the composite wheels of this invention are comparable to several wheels now being sold for use on automobiles. They also show the dramatic improvement that the molding compositions of this invention make on the torque retention of composite wheels made therewith (compare Example 6 with Example 7). This great improvement in torque retention is attributable to the creep resistant molding compositions of this invention which comprise both a vinyl ester resin and a dicyclopentadiene modified polyester resin.

While certain representative embodiments and details have been shown for the purpose of illustrating this invention, it will be apparent to those skilled in the art that various changes and modifications can be made therein without departing from the scope of this invention.

I claim:

1. A molded vehicle wheel that exhibits excellent torque retention under conditions of high heat which comprises (1) from about 15 to about 40 weight percent of a molding composition which is comprised of from 40 to 60 weight percent of a vinyl ester resin and from 40 to 60 weight percent of a dicyclopentadiene polyester resin based on the total weight of said resins wherein said dicyclopentadiene polyester resin is a copolymer of the reaction product of a glycol, an unsaturated dicarboxylic acid or anhydride and dicyclopentadiene, (2) from about 35 to about 75 weight percent of a fiber reinforcement, and (3) from about 5 to about 40 weight percent of a filler.

2. A wheel as specified in claim 1 wherein the vinyl ester resin is the reaction product of a polyepoxide having more than one epoxide group per molecule with an unsaturated monocarboxylic acid or mixtures thereof.

3. A wheel as set forth in claim 1, wherein said molding composition further comprises the reaction product of at least one polymerizable monomer containing at least one vinyl group with said vinyl ester resin and said dicyclopentadiene polyester resin.

4. A wheel as set forth in claim 2 wherein said molding composition further comprises the reaction product of at least one polymerizable monomer containing at least one vinyl group with said vinyl ester resin and said dicyclopentadiene polyester resin.

5. A wheel as specified in claim 3 wherein from about 10 percent to about 55 percent by weight of said polymerizable monomer is present in said molding composition based upon the total weight of said molding composition.

6. A wheel as specified in claim 5 wherein from about 20 percent to about 40 percent by weight of said polymerizable monomer is present in said molding composition based upon the total weight of said molding composition.

7. A wheel as specified in claim 5 wherein said polymerizable monomer is selected from the group consisting of styrene, alpha-methylstyrene, vinyl toluene, 3-methyl-styrene, 4-methylstyrene, 4-cyclohexylstyrene, para-chlorostyrene, 3-vinyl-alpha-methylstyrene, 4-vinyl-alpha-methylstyrene, 1-vinyl napthalene, tertiary butyl styrene, diallyl phthalate, triallyl cyanurate, and 2-vinylnapthalene.

8. A wheel as specified in claim 7 wherein said vinyl ester resin is a phenolic-novalac based vinyl ester resin.

9. A wheel as specified in claim 8 wherein said dicyclopentadiene polyester resin is a dicyclopentadiene modified copolyester of (1) at least one member selected from the group consisting of fumaric acid and maleic acid, and (2) at least one member selected from the group consisting of ethylene glycol, propylene glycol, dipropylene glycol and diethylene glycol.

10. A wheel as specified in claim 9 wherein said dicyclopentadiene polyester resin is a dicyclopentadiene modified copolyester of (1) at least one member selected from the group consisting of fumaric acid and maleic acid and (2) ethylene glycol.

11. A wheel as specified in claim 10 wherein said polymerizable monomer is styrene.

12. A wheel as specified in claim 11 wherein said fiber reinforcement is a glass fiber.

13. A molded vehicle wheel that exhibits excellent torque retention under conditions of high heat which comprises (1) from about 15 to about 40 weight percent of a molding composition which is comprised of from 30 to 70 weight percent of a vinyl ester resin and from 30 to 70 weight percent of a dicyclopentadiene polyester resin based on the total weight of said resins wherein said dicyclopentadiene polyester resin is a copolymer of the reaction product of a glycol, an unsaturated dicarboxylic acid or anhydride and dicyclopentadiene, (2) from about 35 to about 75 weight percent of a fiber reinforcement, and (3) from about 5 to about 40 weight percent of a filler.

14. A wheel as specified in claim 13, wherein the vinyl ester resin is the reaction product of a polyepoxide having more than one epoxide group per molecule with an unsaturated monocarboxylic acid or mixtures thereof.

15. A wheel as specified in claim 13, wherein said molding composition further comprises the reaction product of at least one polymerizable monomer with said vinyl ester resin and said dicyclopentadiene polyester resin wherein said polymerizable monomer contains at least one vinyl group and wherein from about 10 percent to about 55 percent by weight of said polymerizable monomer is present in said molding composition based upon the total weight of said molding composition.

16. A wheel as specified in claim 14, wherein said molding composition further comprises the reaction product of at least one polymerizable monomer with said vinyl ester resin and said dicyclopentadiene polyester resin wherein said polymerizable monomer contains at least one vinyl group and wherein from about 10 percent to about 55 percent by weight of said polymerizable monomer is present in said molding composition based upon the total weight of said molding composition.

17. A wheel as specified in claim 15, wherein said polymerizable monomer is styrene and wherein said fiber reinforcement is a fiber glass.

18. A wheel as specified in claim 16, wherein said polymerizable monomer is styrene and wherein said fiber reinforcement is a fiber glass.

19. A wheel as specified in claim 18, wherein said dicyclopentadiene polyester resin is a dicyclopentadiene modified copolyester of (1) at least one member selected from the group consisting of fumaric acid and maleic acid and (2) ethylene glycol.

20. A wheel as specified in claim 19, wherein said vinyl ester resin is phenolic-novalac based vinyl ester resin.

* * * * *